(12) United States Patent
Cardell et al.

(10) Patent No.: US 9,067,677 B2
(45) Date of Patent: Jun. 30, 2015

(54) DISMOUNTABLE HELICOPTER

(75) Inventors: Per-Erik Cardell, Linköping (SE); Kjell Stenbom, Norrköping (SE); Robert Lidström, Göteborg (SE)

(73) Assignee: SAAB AB, Linköping (SE)

( * ) Notice: Subject to any disclaimer, the term of this patent is extended or adjusted under 35 U.S.C. 154(b) by 362 days.

(21) Appl. No.: 13/513,722

(22) PCT Filed: Dec. 2, 2009

(86) PCT No.: PCT/SE2009/051365
§ 371 (c)(1),
(2), (4) Date: Aug. 15, 2012

(87) PCT Pub. No.: WO2011/068445
PCT Pub. Date: Jun. 9, 2011

(65) Prior Publication Data
US 2012/0298792 A1    Nov. 29, 2012

(51) Int. Cl.
*B64C 1/26* (2006.01)
*B64C 27/12* (2006.01)
*B64C 39/02* (2006.01)
*B64C 1/06* (2006.01)
*B64C 1/30* (2006.01)
*B64C 27/82* (2006.01)

(52) U.S. Cl.
CPC .............. *B64C 39/024* (2013.01); *B64C 27/82* (2013.01); *B64C 1/26* (2013.01); *B64C 1/063* (2013.01); *B64C 1/30* (2013.01); *B64C 27/12* (2013.01); *B64C 2201/024* (2013.01); *B64C 2201/108* (2013.01)

(58) Field of Classification Search
CPC .............. B64C 1/26; B64C 1/28; B64C 1/30; B64C 1/32; B64C 5/12; B64C 27/12; B64C 27/82; A63H 27/12; A63H 31/06
USPC .......... 244/17.19, 17.11, 120, 60, 49; 446/36, 446/37, 57, 58
See application file for complete search history.

(56) References Cited

U.S. PATENT DOCUMENTS 2,947,497 A  *  8/1960  Sznycer ..................... 244/17.11
3,029,047 A     4/1962  Jacobsen et al.
(Continued)

FOREIGN PATENT DOCUMENTS

| DE | 20213638 U1 | * 11/2002 |
| GB | 2359533 A | 8/2001 |
| GB | 2449743 A | 12/2008 |

OTHER PUBLICATIONS

European Search Report—Oct. 11, 2013 (Issued in Counterpart Application No. 09851908.5).
(Continued)

*Primary Examiner* — Tien Dinh
*Assistant Examiner* — Richard R Green
(74) *Attorney, Agent, or Firm* — Venable LLP; Eric J. Franklin

(57) ABSTRACT

An unmanned aerial vehicle helicopter including a dismountable tail section including a torque compensating rotor. Power transmission from the motor to the torque compensating rotor is accomplished by pulley-and-belt drive arrangements.

12 Claims, 8 Drawing Sheets

(56) References Cited

U.S. PATENT DOCUMENTS

| | | | |
|---|---|---|---|
| 3,162,400 A * | 12/1964 | Wood | 244/17.11 |
| 3,921,938 A | 11/1975 | Jupe et al. | |
| 4,245,801 A | 1/1981 | Mulvey | |
| 4,272,041 A | 6/1981 | Mabuchi et al. | |
| 5,836,545 A | 11/1998 | Arlton et al. | |
| 6,050,521 A | 4/2000 | Regonini | |
| 6,065,718 A | 5/2000 | Piasecki | |
| 6,126,113 A | 10/2000 | Navickas | |
| 2009/0134269 A1 * | 5/2009 | Luo | 244/60 |

OTHER PUBLICATIONS

PCT/ISA/210—International Search Report—Aug. 5, 2010.
PCT/ISA/237—Written Opinion of the International Searching Authority—Aug. 5, 2010.

* cited by examiner

DISMOUNTABLE HELICOPTER

CROSS-REFERENCE TO RELATED APPLICATIONS

This is the national phase under 35 U.S.C. §371 of PCT/SE2009/051365 filed 2 Dec. 2009.

FIELD OF THE INVENTION

The invention relates to an unmanned aerial vehicle (UAV) helicopter comprising a dismountable tail section with a torque compensating rotor, wherein power transmission from the motor to the torque compensating rotor is accomplished by pulley-and-belt drive arrangements.

BACKGROUND OF THE INVENTION

Unmanned helicopters are frequently used for exploration purposes. Such helicopters are often operated from ships. Therefore, UAV helicopters must be easily transportable and light-weight. Furthermore, UAV helicopters should be easy to store on a ship, when not in use. The propulsion of the rotors should thus allow for quick and easy assembly/disassembly of the helicopter, thereby simplifying transportation and storage. Additionally, UAV helicopters should be easy to maintain.

Dismountable helicopters are generally known. For example, a modular airframe and rotor unit is known from GB 2,359,533. The torque compensating rotor in the tail of the helicopter is driven by a thin-walled drive shaft, detachably connected to the main power drive. A belt drive propulsion of the tail rotor is not disclosed.

U.S. Pat. No. 3,029,047 describes a collapsible helicopter which comprises certain pivotable or foldable components. The helicopter may be disassembled and collapsed into a portable and light-weight package for transportation. This type of helicopter is, however, not unmanned and its tail rotor is driven by a drive shaft. A belt drive arrangement is not disclosed.

U.S. Pat. No. 3,921,938 describes a helicopter which rotor blades are foldable and which tail is pivotally attached to the fuselage to attain a stowed position of the helicopter.

GB 2,449,743 describes an aircraft which can be dismounted into different parts; inter alia its rear part is entirely separable from the front part of the aircraft.

U.S. Pat. No. 6,050,521 discloses a releasable coupling for a power transmission to a tail rotor of a foldable-tail-section helicopter. The coupling consists of two coupling assemblies, one associated with the front section of the helicopter, the other one associated with the tail section of the helicopter. The two coupling assemblies are coupled via radial toothings, cooperating telescopically with each other.

In view of the above referenced state of the art, it is an object of the present invention to provide a UAV helicopter that has a light-weight, yet robust construction. Furthermore, the power transmission from the engine to the tail rotor is to be efficient and should allow quick and easy connection of the tail section to the fuselage. Additionally, it is an objective to provide for a low noise and easy-to-maintain tail rotor propulsion.

SUMMARY OF THE INVENTION

The above objectives are achieved, in accordance with the present invention, by providing a dismountable helicopter comprising a front section and a tail section, said tail section being dismountably connected to said front section; a motor; a torque compensating rotor; and power transmitting means for transmitting power from said motor to said torque compensating rotor. The power transmitting means comprises a first pulley-and-belt-drive arrangement for power transmission in said front section; and a second pulley-and-belt-drive arrangement for power transmission in said tail section.

Said first and said second pulley-and-belt-drive arrangements each have a first pulley and a second pulley and a belt for transferring power between said first and said second pulleys, respectively. Mechanical coupling means are provided for transmitting power from said first pulley-and-belt-drive arrangement to said second pulley-and-belt-drive arrangement.

In one embodiment of the invention, the mechanical coupling means comprises a common drive shaft to which said second pulley of said first pulley-and-belt-drive arrangement and said first pulley of said second pulley-and-belt-drive arrangement are fixedly connected, preferably by a torque-proof connection. With "torque-proof" is meant that the two pulleys are fixed to the same common drive shaft, such that rotational movement of the two pulleys relative to each other is avoided.

The common drive shaft may comprise two parts, releasably connectable to each other to form a torque-proof connection. Any suitable type of shaft coupling means can be used. The releasable connection between the two parts of the common drive shaft is preferably between the two pulleys fixedly connected to the common drive shaft. Suitable connections between the first and second part of the common drive shaft are known in the art. Preferred connections are form-locking connections, such as form-locking plug connections, e.g., a torx connection. In one embodiment, an external jacket having protrusions and/or indentations cooperating with corresponding indentations and/or protrusions on the common drive shaft can be used to accomplish the torque-proof connection. Provision of a common drive shaft having two connectable parts, as described above, allows easy mounting and dismounting of the tail section of the helicopter, without the need to connect or disconnect belts to and from the first and/or second pulley and belt drive arrangement.

In an alternative embodiment said coupling means comprises a gearwheel connection (or a gearwheel coupling) between said second pulley of said first pulley-and-belt-drive arrangement and said first pulley of said second pulley-and-belt-drive arrangement. The gear-wheel connection allows assembling the tail section to the front section without having to pull a respective belt over the respective pulleys.

Both mentioned coupling arrangements serve to transfer torque and/or energy from said first pulley-and-belt-drive arrangement to said second pulley-and-belt-drive arrangement.

Preferably, the belt is a toothed belt. Toothed belts provide for low maintenance, for example, no lubrication is required. If appropriately installed, toothed belts effectively avoid slippage.

In a preferred embodiment of the invention one of said first and said second pulley-and-belt-drive arrangements is coupled to a gearbox. The gearbox may be coupled via elastic shaft coupling means to a main drive shaft. The gearbox is preferably provided in the front section of the helicopter.

In a preferred embodiment of the invention, said front section comprises a first connecting frame and said tail section comprises a second connecting frame. Preferably, said first and/or said second connecting frame comprise at least one alignment bolt for aligning said first and said second connecting frame to each other in an aligned position. Also preferred is that said first and/or second connecting frame further comprise securing means for securing said first and second connecting frame in said aligned position.

In a preferred embodiment according to the invention said power transmitting means further comprises belt tightening means. The tightening means may be adapted to adjust a belt at a pre-determined tension.

The tail section of a dismountable helicopter according to the invention may comprise a carbon fiber material. Preferably, the tail section is made of carbon fiber material.

The helicopter of the present invention preferably comprises a torque compensation rotor unit, which is detachable from the tail section.

DETAILED DESCRIPTION OF THE INVENTION

The present invention relates to a dismountable helicopter 1 that allows for dismounting of its tail section 3 from its front section 2. Helicopter 1 is preferably an unmanned aerial vehicle (UAV) helicopter.

Figure 1:
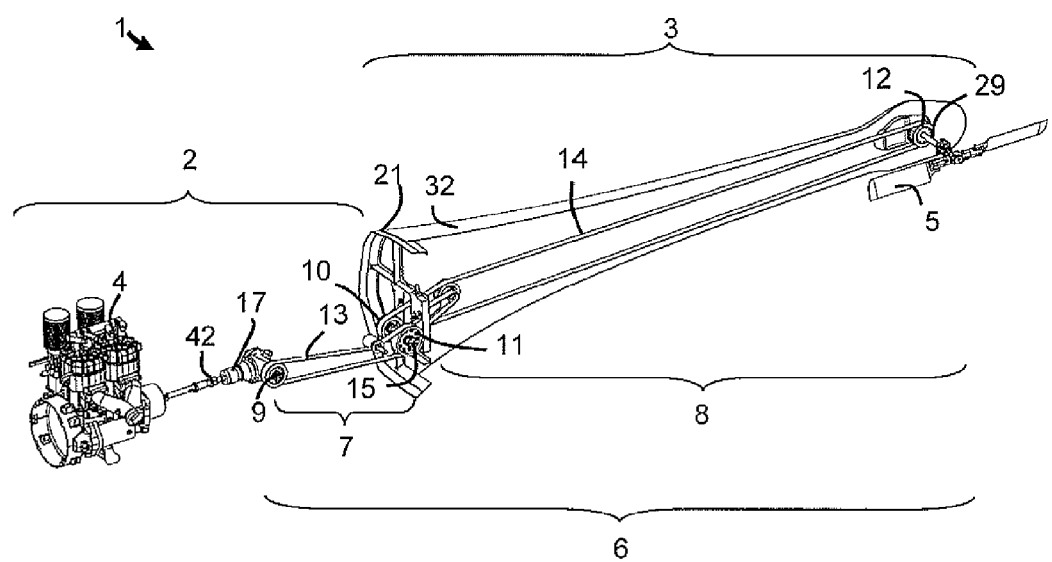
FIG. 1 shows power transmitting means from a motor to a torque compensating rotor, according to the invention.

As can best be seen in FIG. 1, power transmitting means 6 is provided for power transmission between a motor 4 and tail rotor 5. Power transmitting means 6 comprises two parts: a first pulley-and-belt-drive arrangement 7, and a second pulley-and-belt-drive arrangement 8, the two parts being mechanically coupled for power transmission by coupling means 15. The pulley-and-belt-drive arrangements 7 and 8 are coupled via coupling means 15 at the intersection of front section 2 and the tail section 3. The pulley-and-belt-drive arrangements 7 and 8 are light-weight when compared to drive shaft constructions. The pulley-and-belt-drive concept supports low noise operation of the helicopter. The separation of the dismountable tail section 3 from the front section 2 makes the helicopter easily transportable and provides for convenient storage. Additionally the modular concept provides for easy maintenance.

As shown in FIG. 1, helicopters of the invention comprise a front section 2 and a tail section 3. The tail section 3 is dismountably connected to the front section 2.

Power transmitting means 6, transmit power from the motor 4 to the torque compensating rotor 5.

The power transmitting means 6 comprises a first pulley-and-belt-drive arrangement 7 and a second pulley-and-belt-drive arrangement 8. The first pulley-and-belt-drive arrangement 7 is associated with the front section of the helicopter, and second pulley-and-belt-drive arrangement 8 is provided in the tail section 3 of the helicopter.

A gearbox 16 is preferably provided in the front section of the helicopter. This provides for a good weight distribution, which in turn results in better flight performance.

In case a gearbox 16 is provided in the front section 1 of the helicopter, the first pulley-and-belt-drive arrangement 7 is responsible for transmitting power from a gearbox to mechanical coupling means 15. Mechanical coupling means 15 are preferably located close to the intersection of front to tail section of the helicopter.

The second pulley-and-belt-drive arrangement 8 is responsible for transmitting power from coupling means 15 to the torque compensating rotor 5, provided in the tail section 3 of the helicopter.

The coupling between the motor 4 and the gearbox 16 may be via elastic shaft coupling means 17. The elastic shaft coupling means 17 may comprise a rubber coupling. Elastic coupling means 17 can be interposed between a main drive shaft 42 and drive shaft of the gearbox. It may be provided with either axial or radial toothing. One example for the rubber coupling is a rubber sleeve that connects the main drive shaft 42 and the gearbox shaft via a radially arranged rubber sleeve. In another embodiment the elastic shaft coupling means 17 comprise two rigid annuli that are disposed in concentric, radial alignment to each other, and an elastic layer or element that is interposed between them. The inner annulus is, for example, connected to the main drive shaft 42 and the outer annulus is connected to the drive shaft of the gearbox 16, which is mechanically connected by coupling means 17. Elastic shaft coupling means 17 offers the advantage of reducing oscillations, e.g. caused by the main rotor assembly or rotational or torsional oscillations from the motor 4.

Figure 2:
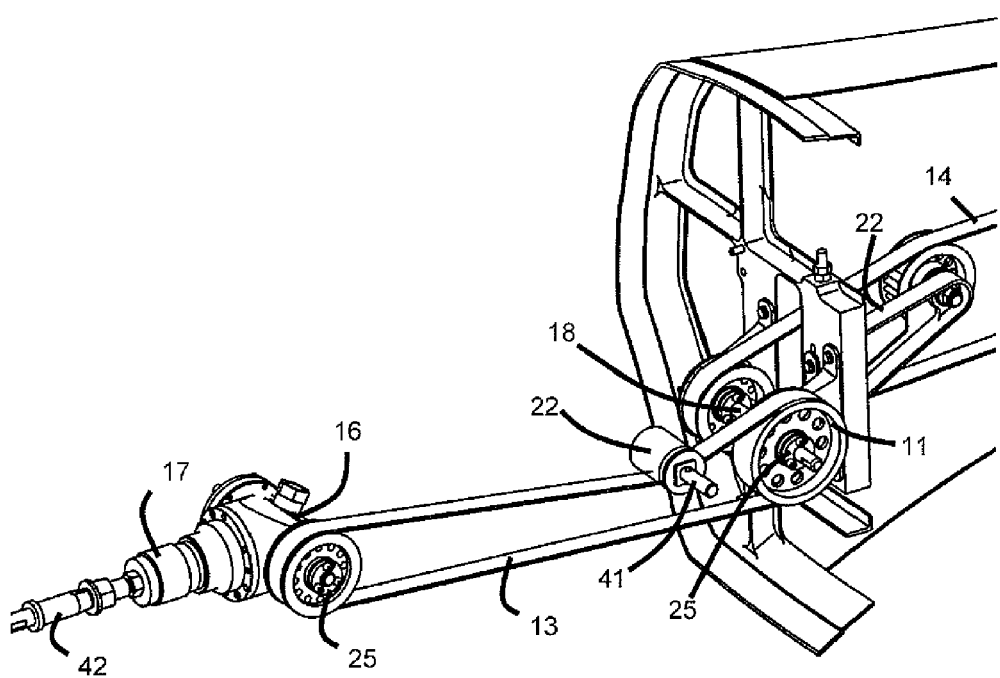
FIG. 2 shows a more detailed view of a first pulley-and-belt-drive arrangement.

FIG. 2 shows coupling means in form of a common drive shaft 18. Here, the first pulley-and-belt-drive arrangement 7 is coupled with second pulley-and-belt-drive arrangement 8 in that the second pulley of the first pulley-and-belt-drive arrangement and the first pulley of the second pulley-and-belt-drive arrangement are fixedly attached to a common drive shaft 18.

Figure 4:
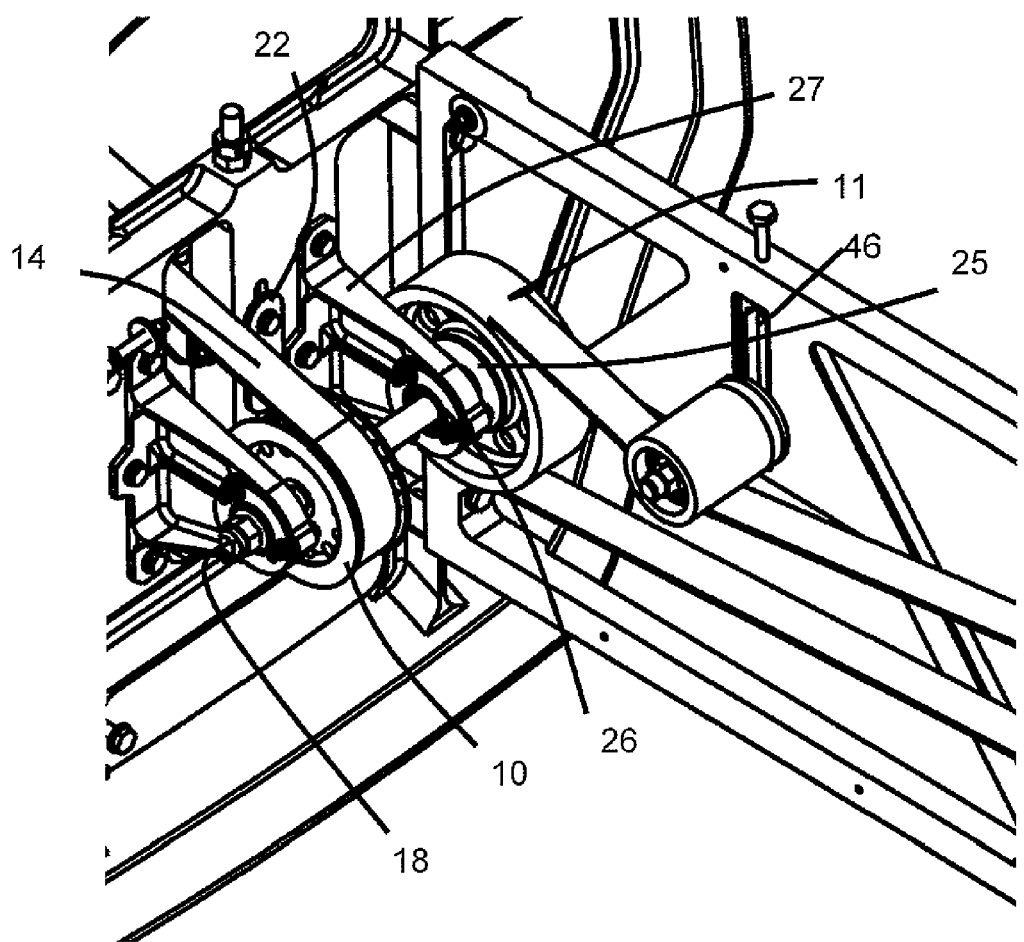
FIG. 4 shows a further detail of the power transmitting means of the invention.

FIG. 4 shows coupling means comprising a common drive shaft 18 on which two pulleys are mounted. Common drive shaft 18 provides for power transmission between first pulley-and-belt-drive arrangement 7 and second pulley-and-belt-drive arrangement 8. The common drive shaft 18 is rotatably mounted on roller bearings 26. The roller bearings 26 of the common drive shaft 18 are preferably enclosed in bearing housings. The roller bearings are dimensioned such as to tolerate some degrees (smaller than 5°) of vertical misalignment of the common drive shaft 18.

Figure 7:
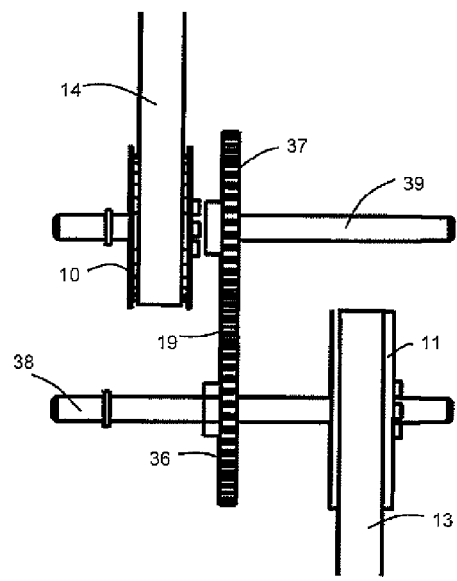
FIGS. 7 to 9 show coupling means using gear-wheels.
Figure 8:
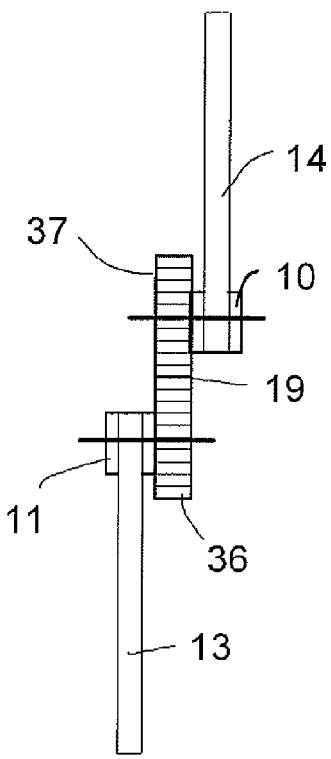
Figure 9:
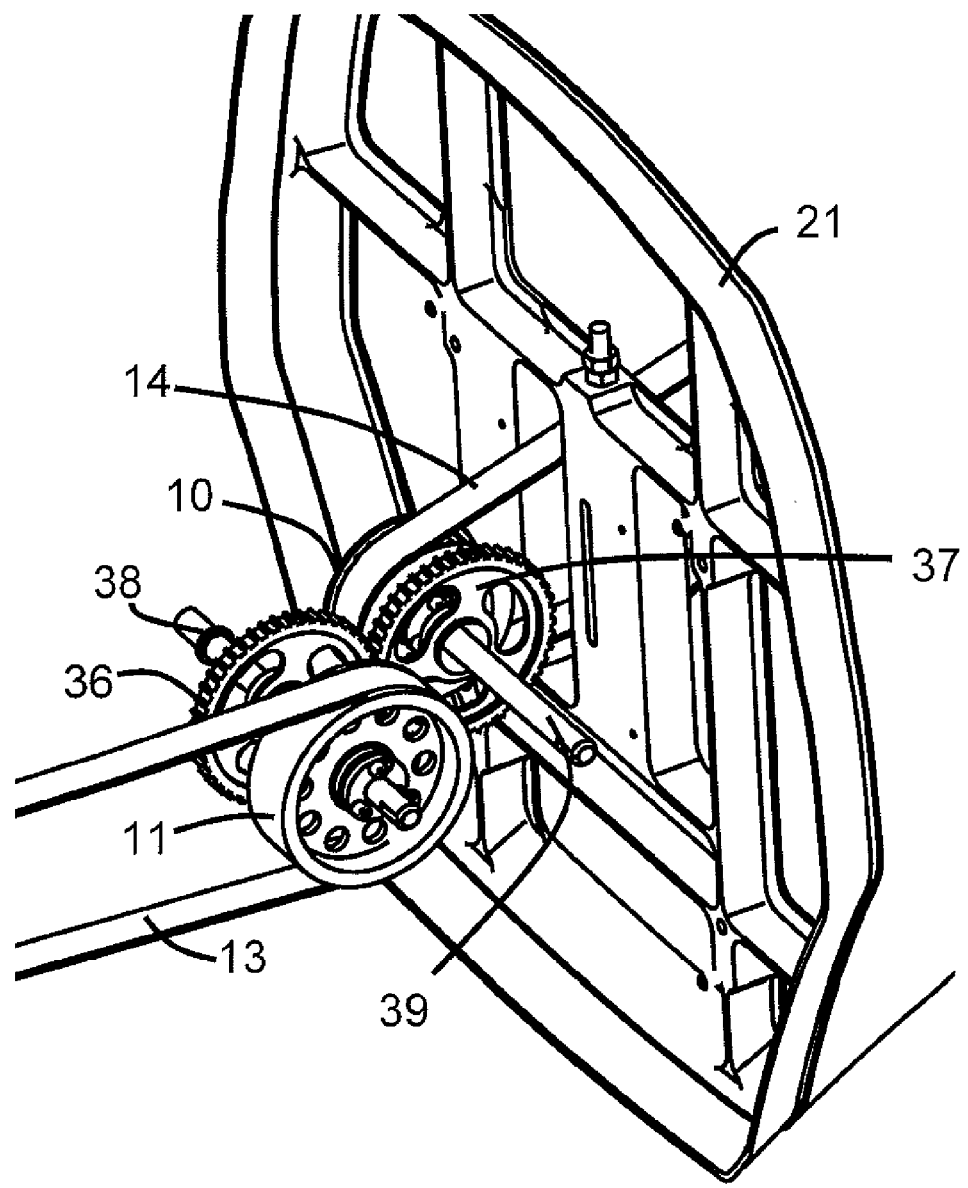

In another preferred embodiment coupling means 15 comprises a gearwheel connection 19, as for example shown in FIGS. 7 and 8. The gearwheel connection 19 provides for power transmission from first pulley-and-belt-drive arrangement 7 to second pulley-and-belt-drive arrangement 8.

Figure 5:
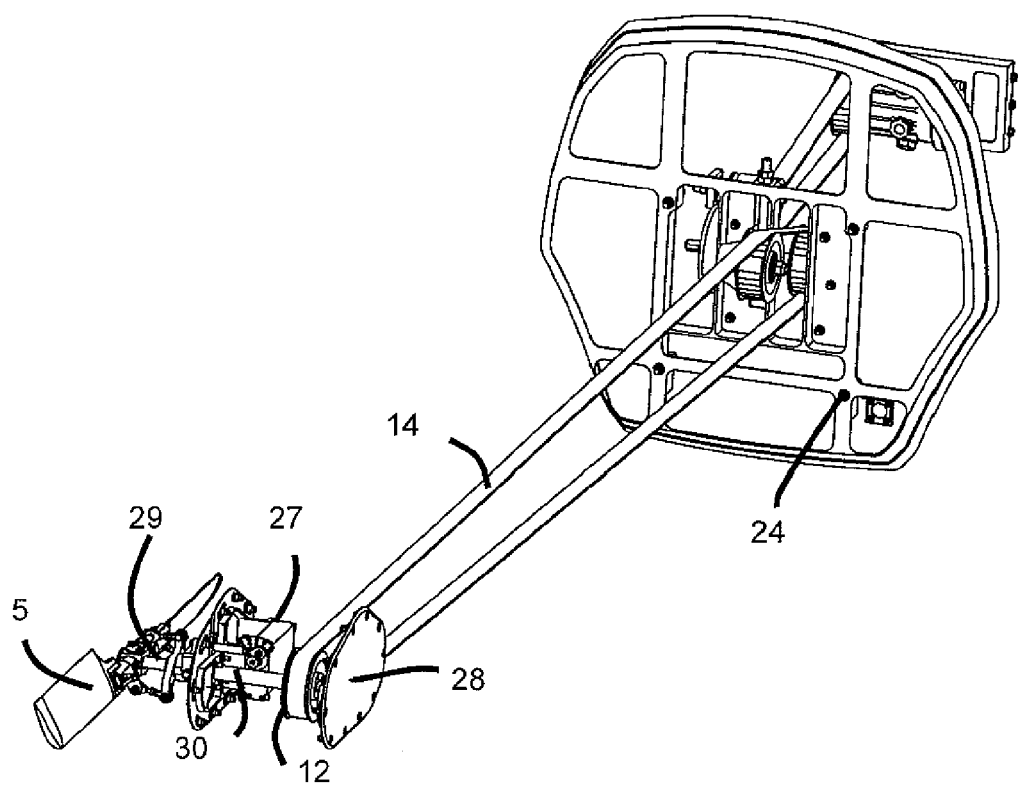
FIG. 5 shows a rear view of the power transmitting means of the invention and a tail rotor.

As shown in FIG. 5 the torque compensating rotor 5 is connected to a rotor shaft 29. Also shown is a counter plate 28 and torque compensating rotor steering means 27. The second pulley 12 of the second pulley-and-belt-drive arrangement 8 is mounted on the rotor shaft 29.

In one embodiment the torque compensating rotor 5 comprises two tail rotor sub-units. The first tail rotor sub-unit comprises the tail rotor 5 comprising the rotor shaft 29, the steering means 27, the alignment tube 30, the expander bushing 25 and the second pulley 12. The first tail rotor sub-unit may be a pre-assembled unit. The second tail rotor sub-unit comprises the counter plate 28 to which roller bearings 26 are attached. Detachable tail rotor sub-units provide for a quick exchange in case of maintenance. The torque compensating rotor steering means 27 are controlled by an electronic control unit provided in the front section 2 of the helicopter. The steering means 27 preferably comprises a servomotor. The modular unit of the torque compensating rotor 5 of the tail section 3 may be pre-installed to the tail section prior to mounting the tail section 3 to the front section 2 of the helicopter.

Front section 2 and tail section 3 can be attached to each other by first connecting frame 20 of the front section and second connecting frame 21 of the tail section.

Figure 6:
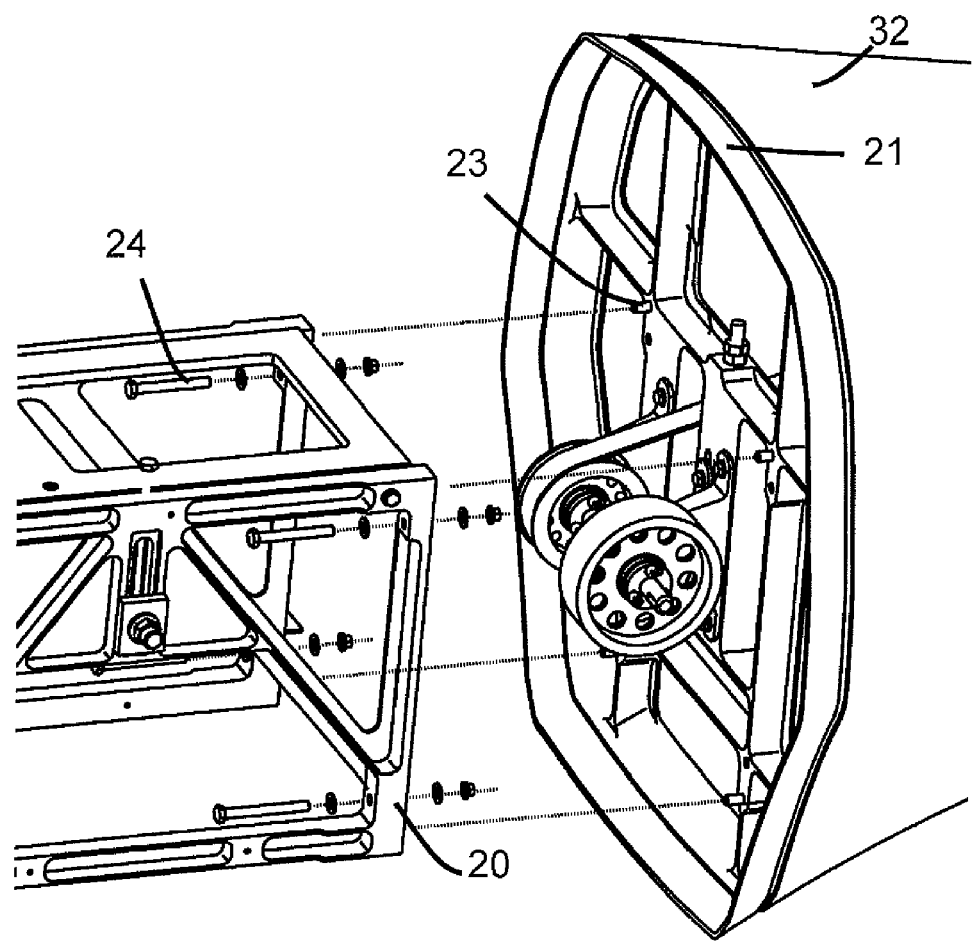
FIG. 6 shows connection frames for connecting front section to tail section of helicopters of the invention.

FIG. 6 shows a detailed view of the connecting frames of the invention. The connecting frames are preferably made of metal or a metal alloy. Alternatively, the connecting frames can be made of a thermoplastic polymer or composite materials, for example, carbon fibers or a metal matrix composite material (MMC).

As can be seen in FIG. 1, the tail section 3 comprises the second connecting frame 21, the torque compensating rotor 5 and the tail body 32. The tail body is preferably made of lightweight materials e.g. carbon fiber materials. The second connecting frame 21 is attached to the tail body 32 either by adhesive coupling or otherwise mechanically attached.

Figure 3:
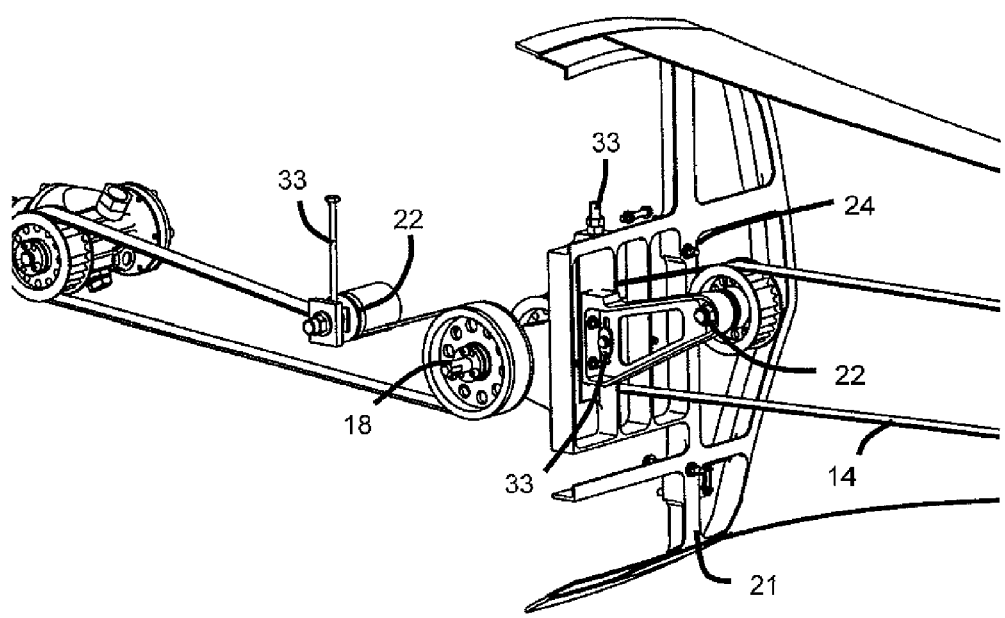
FIG. 3 shows a first pulley-and-belt-drive arrangement from a different angle.

The first pulley-and-belt-drive arrangement 7 and second pulley-and-belt-drive arrangement 8 may each comprise tightening means 22 (shown in FIG. 2, FIG. 3). Tightening means 22 are preferably adjustable via tightening screws 33, 34. Tightening means 22 may be used to adjust the tension of the belts in pulley-and-belt-drive arrangements 7 and 8. Tightening means 22 for the tail section 3 may be pre-set and the tension of the tension means 22 is thus adjusted prior to mounting the tail section 3 to the front section 2.

FIG. 6 provides a detailed view of the connection between front section 2 and tail section 3. Connection is accomplished by first connecting frame 20 and second connecting frame 21. The mounting of the tail section 3 is accomplished by plugging tail section 3 with connecting frame 21 and alignment bolts 23 into the first connecting frame 20 and thereafter securing first connecting frame 20 and second connecting frame 21 in their aligned position with securing means 24. Securing means 24 may be screws (machine screws, security screws, socket cap screws, hex cap screws) or bolts (tap bolts, toggle bolts, carriage bolts), preferably with respective nuts. Other preferred securing means are quick disconnect fasteners or snap fasteners. The tail section 3 can preferably be mounted to the front section 2 in about form one to five minutes.

After mounting the tail section 3 to front section 2, first belt 13 of the first pulley-and-belt-drive arrangement 7 may be pulled over the second pulley 11 of the first pulley-and-belt-drive arrangement 7 (as shown in FIG. 2). Thereafter, the first belt 13 is tensioned with tightening means 22. The tension of first and second belts 13 and 14 can preferably be measured via a tension meter. The tension of the belt can e.g. be determined by measuring the oscillating frequency of the tensioned belts.

Tightening means 22 may be glidingly suspended on guiding rail 46. In a tightened state the tightening means 22 presses the respective belt downwards in order to tighten the belt. In one embodiment of tightening means 22 there is provided a pulley rotatably mounted on tightening means shaft 41 with roller bearings.

Preferred belts of the present invention are round belts, "Vee" belts, toothed belts or timing belts. These belts are known in the art. Vee belts provide a good traction at high speed of movement, relatively low load of the bearings, and long life. Toothed belts have teeth that fit into a matching toothed pulley (e.g. 9, 10, 11, 12). When the belts are correctly tensioned, they have no slippage and run at constant speed. Toothed belts in helicopters of the invention can preferably run 4000 hours and more.

Referring now to FIG. 7, second pulley 11 and a gearwheel 36 are fixed to shaft 38 in a torque-proof fashion. A similar configuration is provided for the first pulley 10 and gearwheel 37. The first pulley 10 and the second gearwheel 37 are attached in a torque-proof fashion to shaft 39. The first gearwheel 36 engages with second gearwheel 37 when tail section 3 is mounted to the front section 2. This ensures easy assembly, because belt 13 has not to be pulled over the pulley 11 upon assembly.

An alternative connection 19 is shown in FIG. 8. Gearwheels 36, 37 and pulleys 10, 11 are in close proximity, or built in one piece. Such gearwheel connections tend to have reduced weight.

Pulleys (9, 10, 11, 12) of the invention are preferably made of lightweight materials, such as aluminum or other metal alloys. Other preferred materials are synthetic materials. Synthetic materials are to a large extent maintenance free, wear-resistant, shock-resistant and produce low noise.

Preferably the tread surface of the pulleys is convex. This brings forward the positive effect that belts self-align on said convex tread surface upon rotation of the pulleys. Pulleys may also be provided with flanges at both sides of the tread surface.

The pulleys and/or gearwheels may have a notch which cooperates with a corresponding protrusion on the respective shaft to provide a torque-proof connection. The notch allows for a keying to fit in an expander bushing 25 in a predetermined manner and may be used to lock gearwheels and/or pulleys on the various shafts.

The invention claimed is:

1. A dismountable helicopter, comprising:
   a front section and a tail section, said tail section being dismountably connected to said front section;
   a motor,
   a torque compensating rotor, and
   a light-weight power transmitter configured to transmit power from said motor to said torque compensating rotor, wherein said power transmitter comprises a first pulley and belt drive arrangement configured to transmit power in said front section and a second pulley and belt drive arrangement configured to transmit power in said tail section, wherein said first pulley and belt drive arrangement and said second pulley and belt drive arrangement each comprise a first pulley, a second pulley and a belt configured to transfer power between said first pulley and said second pulley, respectively, and a mechanical coupling configured to transmit power from said first pulley and belt drive arrangement to said second pulley and belt drive arrangement, wherein said mechanical coupling comprises a gearwheel connection between said second pulley of said first pulley and belt drive arrangement and said first pulley of said second pulley and belt drive arrangement, such that the first pulley and belt drive arrangement transmits power from the motor to the mechanical coupling and the second pulley and belt drive arrangement transmits power from the mechanical coupling to the torque compensating rotor, and wherein the mechanical coupling permits the tail section to be mounted on the front section without pulling the belt over the first pulley or second pulley of the belt drive arrangements.

2. The dismountable helicopter according to claim 1, wherein said first or said second pulley and belt drive arrangement is coupled to a gearbox.

3. The dismountable helicopter according to claim 2, wherein said gearbox is coupled via an elastic shaft coupling to a main drive shaft of said motor.

4. The dismountable helicopter according to claim 2, wherein said gearbox is provided in said front section of said helicopter.

5. The dismountable helicopter according to claim 1, wherein said helicopter is an unmanned aerial vehicle.

6. The dismountable helicopter according to claim 1, wherein said belts are toothed belts.

7. The dismountable helicopter according to claim 1, wherein said front section comprises a first connecting frame and said tail section comprises a second connecting frame, said first and/or said second connecting frame comprising at least one alignment bolt for aligning said first and said second connecting frame in an aligned position, said first and/or second connecting frame further comprising a securing module configured to secure said first and second connecting frame in said aligned position.

8. The dismountable helicopter according to claim 1, wherein said power transmitter further comprises a belt tightener.

9. The dismountable helicopter according to claim 8, wherein said tightener is adapted to adjust a belt at an adjustable tension.

10. The dismountable helicopter according to claim 1, wherein said tail section comprises carbon fiber material.

11. The dismountable helicopter according to claim 1, wherein said torque compensating rotor is detachable.

12. A method of driving a torque compensating rotor of a UAV helicopter comprising a front section and a tail section dismountably connected to the front section, the method comprising:

driving said torque compensating rotor with a light-weight power transmitter, said power transmitter comprising a first pulley and belt drive arrangement configured to transmit power in said front section and a second pulley and belt drive arrangement configured to transmit power in said tail section; said first pulley and belt drive arrangement and said second pulley and belt drive arrangement each comprise a first pulley, a second pulley and a belt configured to transfer power between said first pulley and said second pulley, respectively, wherein the mechanical coupling permits the tail section to be mounted on the front section without pulling the belt over the first pulley or second pulley of the belt drive arrangements; and transmitting power from said first pulley and belt drive arrangement to said second pulley and belt drive arrangement with a mechanical coupling comprising a gearwheel connection between said second pulley of said first pulley and belt drive arrangement and said first pulley of said second pulley and belt drive arrangement, such that the first pulley and belt drive arrangement transmits power from the motor to the mechanical coupling and the second pulley and belt drive arrangement transmits power from the mechanical coupling to the torque compensating rotor.

\* \* \* \* \*